Sept. 1, 1925.

C. H. SUCKAU

TIRE VALVE

Filed Dec. 14, 1923.

C. H. Suckau
INVENTOR

BY Victor J. Evans
ATTORNEY

WITNESS:

Sept. 1, 1925.
C. H. SUCKAU
TIRE VALVE
Filed Dec. 14, 1923
1,551,710
2 Sheets-Sheet 2
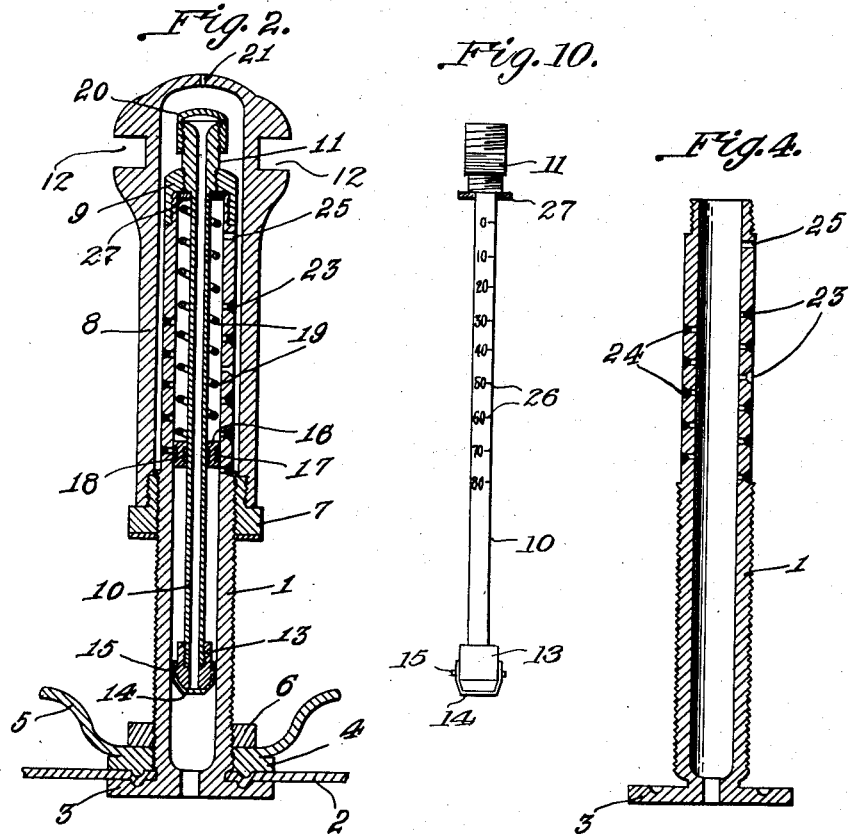
C. H. Suckau
INVENTOR
BY Victor J. Evans
ATTORNEY
WITNESS:

Patented Sept. 1, 1925.

1,551,710

UNITED STATES PATENT OFFICE.

CORNELIUS H. SUCKAU, OF KORBA, VIA CHAMPA, INDIA.

TIRE VALVE.

Application filed December 14, 1923. Serial No. 680,709.

*To all whom it may concern:*

Be it known that I, CORNELIUS H. SUCKAU, a citizen of the United States, residing at Korba, via Champa, C. P., India, have invented new and useful Improvements in Tire Valves, of which the following is a specification.

This invention relates to a combined tire valve and pressure gauge for pneumatic tires and the like, the general object of the invention being to provide adjustable means for permitting air to escape from the tube when the proper pressure has been introduced into the same.

Another object of the invention is to provide a novel form of valve for permitting air to be introduced into the tube and which will act to prevent escape of air therefrom.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 2 is an enlarged sectional view through the device itself.

Figure 4 is a longitudinal sectional view of the same.

Figure 5 is a transverse sectional view.

Figure 6 is a similar view taken on a different plane.

Figure 10 is an elevation of the indicating element embodied in the invention.

Figure 1:
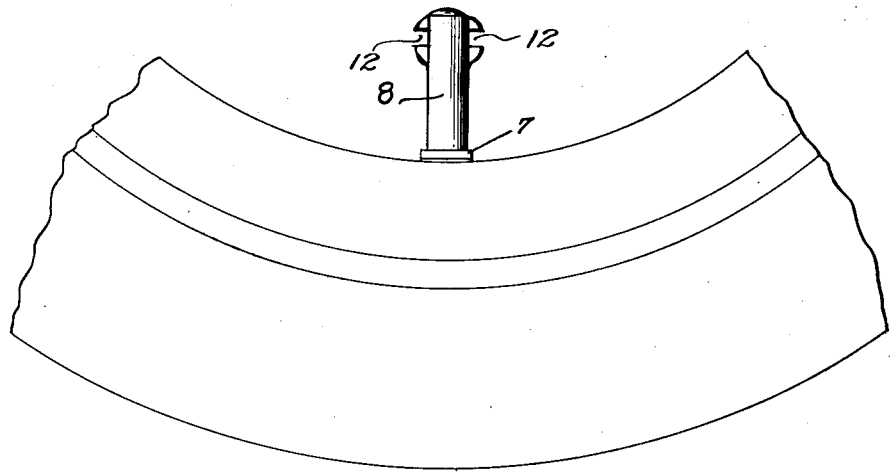
Figure 1 is a portion of a wheel showing the invention in use.
Figure 3:
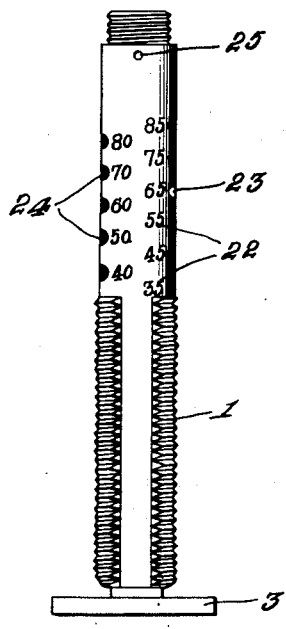
Figure 3 is an elevation of part of the invention.
Figure 7:
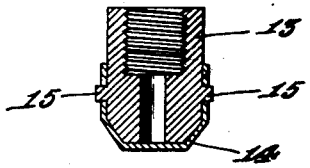
Figure 7 is a detail sectional view of the valve used in conjunction with the device.
Figure 8:
Figure 8 is a top plan view of the same.
Figure 9:
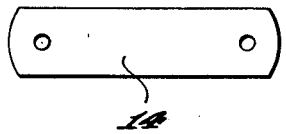
Figure 9 is an elevation of the strip used on the valve.

In these views, 1 indicates the stem which is connected with the tube 2 in the usual or any desired manner, the means shown consisting of the base 3 on the stem to which a portion of the tube is clamped by the member 4 which carries the spring 5 and the nut 6. The lower part of the stem is screw threaded to receive said nut 6 and the nut 7 which engages the felly of the wheel and which has a reduced threaded part to receive the dust cap 8. A cap 9 is threaded to the upper end of the stem and a tube 10 passes through the cap, to which it is threaded, the upper end of the tube being enlarged and threaded to receive the usual air chuck of a pump or other source of air. I prefer to form the upper end of the tube with a part 11 which is engaged by the wrench parts 12 on the dust cap so that the tube can be removed from the cap whenever desired. A valve cap 13 is threaded to the lower end of the tube and the opening in this cap is controlled by the flexible strip 14 which is held to the cap by the pins 15. A ring-shaped piston 16 is arranged in the stem and surrounds the tube 10, this piston being provided with an outer packing ring 17 and an inner packing ring 18 for making a tight joint with both the stem and the tube. The piston is normally held in its lowered position by a spring 19. A cap 20 is arranged to close the upper end of the tube 10 and the dust cap is provided with a small opening 21. The stem is provided with graduations 22 which are arranged opposite holes 23 formed in the stem, all but one of which being designed to be closed by plugs 24 of lead or the like. A hole 25 is formed adjacent the upper end of the stem.

From the foregoing it will be seen that by removing the dust cap and the cap 20 air can be forced into the tube by attaching a pump or the like to the threaded upper end of the tube 10. The flat valve 14 will permit air to pass from the tube 10 but will prevent the air from escaping therefrom. As the pressure increases in the tire and the interior of the stem the piston 16 will be raised against the action of its stem until the hole 23 which is open is uncovered by the piston when the air will escape and thus prevent an excess pressure occurring in the tire. The hole 25 will permit free movement of the piston when it passes the hole 23 and it will of course be understood that the proper hole 23 will be open to suit the tire on which the device is used. By providing a plurality of holes the device can be used on different sizes of tires. This device will also prevent injury to tires caused by the expansion of air therein during hot weather or on long runs as it will automatically act to keep the pressure below a certain point. The escaping air will act to notify the person placing air in the tire that the proper amount has been introduced. When it is desired to deflate a tire, it is simply necessary to unscrew the tube 10 at part 11 with wrench part 12 on dust cap and by means of the tube pull up the piston 16 sufficiently to uncover the open hole 23 through which air can thus escape. The hole 21 will permit any air to escape from the dust cap which escapes from the device due to the lifting of the piston by increased pressure in the tire from heat. With this gauge the same inner tube can be used in an old outer tire with equal advantage by opening a lower hole 23 and if afterwards this inner tube is to be used in a new outer tire this lower hole can be closed again, thus giving the standard pressure again for the new tire.

It is thought from the foregoing description that the advantages and novel features of my invention will be readily apparent.

I desire it to be understood that I may make changes in the construction and in the combination and arrangement of the several parts, provided that such changes fall within the scope of the appended claim.

By simply providing the tube 10 with graduations 26, which are fixed relatively to the distance between the top of cap 13 and the lower end of piston 16, the exact amount of pressure in the tire can be ascertained by unscrewing tube 10 at part 11 with wrench part 12 on dust cap. The force of the air in the tire will then push the tube up till the cap 13 touches the piston. Just above cap 9 the pressure in the tire will thus be shown by the respective number of the graduations visible at that point. In order to keep the tube 10 in alignment with the stem 1 when unscrewed it passes through a washer 27 which may be attached to the spring 19.

What I claim is:—

An inflating valve for pneumatic tires comprising a tube adapted to be arranged within a tire stem, a cap threaded upon the upper end thereof, a head threaded upon the lower end and having a tapered face, a flexible valve strip positioned over the lower end of the valve and having its ends extended upon opposite sides of the tapered head, and lateral pins extending from the head and passing through the ends of the flexible strip.

In testimony whereof I affix my signature.

CORNELIUS H. SUCKAU.